(12) United States Patent
Su et al.

(10) Patent No.: US 6,844,078 B2
(45) Date of Patent: Jan. 18, 2005

(54) POLYOLEFIN OIL RESISTANT FILM USING HIGH ISOTACTIC CONTENT POLYPROPYLENE

(75) Inventors: Tien-Kuei Su, Saunderstown, RI (US); Keunsuk P. Chang, North Kingstown, RI (US)

(73) Assignee: Toray Plastics (America) Inc., N. Kingstown, RI (US)

( * ) Notice: Subject to any disclaimer, the term of this patent is extended or adjusted under 35 U.S.C. 154(b) by 50 days.

(21) Appl. No.: 10/357,395

(22) Filed: Feb. 4, 2003

(65) Prior Publication Data

US 2003/0148119 A1 Aug. 7, 2003

Related U.S. Application Data

(60) Provisional application No. 60/354,266, filed on Feb. 6, 2002.

(51) Int. Cl.$^7$ ............................ B32B 27/32; B32B 15/08
(52) U.S. Cl. ........................ 428/461; 428/213; 428/516
(58) Field of Search ................................ 428/515, 516, 428/523, 213, 461; 525/240; 526/351, 943

(56) References Cited

U.S. PATENT DOCUMENTS

| | | | |
|---|---|---|---|
| 5,500,282 A | | 3/1996 | Heffelfinger et al. |
| 5,667,902 A | | 9/1997 | Brew et al. |
| 2002/0032295 A1 | * | 3/2002 | Peiffer et al. ............ 526/348.1 |

FOREIGN PATENT DOCUMENTS

| | | |
|---|---|---|
| EP | 0 186 279 | 7/1986 |
| EP | 0 444 340 | 9/1991 |
| EP | 0 909 636 | 4/1999 |
| JP | 404216829 * | 8/1992 |

* cited by examiner

Primary Examiner—D. Lawrence Tarazano
(74) Attorney, Agent, or Firm—Morrison & Foerster LLP

(57) ABSTRACT

A coextruded multilayer film, having of at least a high crystalline propylene homopolymer resin layer of isotactic content greater than about 95%; a discharge-treated surface on one side of said polyolefin resin layer; an amount of hydrocarbon resin up to 10% by weight of the high crystalline propylene homopolymer of greater than about 95% isotactic content; and on the high crystalline propylene homopolymer resin layer side opposite said discharge-treated surface, a heat sealable layer or winding layer having an antiblock is disclosed.

15 Claims, No Drawings

POLYOLEFIN OIL RESISTANT FILM USING HIGH ISOTACTIC CONTENT POLYPROPYLENE

FIELD OF INVENTION

This invention relates to a polyolefinic multilayer film comprising a base layer of polypropylene and at least one outer layer. More specifically, the invention relates to a biaxially oriented polypropylene film that does not distort in the presence of food oils.

BACKGROUND OF INVENTION

Biaxially oriented polypropylene film laminations are commonly used in the snack food packaging industry. In particular, potato chip packaging is a very large volume application. Typically, for this application a metallized, sealable, biaxially oriented polypropylene film is used as the inside layer of the lamination. This film is then laminated to a printed biaxially oriented sealable slip film using a polyethylene extrudate to bond the two films together. The lamination is then shipped to the potato chip manufacturer for vertical form-fill-and-seal (VFFS) packaging.

It is required that the finished package product have the following characteristics: 1) Strong heat seals; 2) Excellent barrier; 3) Excellent lamination bond strength; 4) Excellent print quality; 5) Excellent gloss or surface aesthetics.

Recently, it has been found that at elevated temperature storage or transporting conditions such as might be encountered during hot summer months, these packages can become distorted. This distortion appears to be a result of food oil absorption by the polyolefin film from the potato chips. The surface distortion effectively destroys the surface gloss of the package and gives the appearance that the package has been handled and abused. This distortion is undesirable to snack food manufacturers as they would like to present the product as being fresh or new to the shelf. In addition, it is also important that the surface give a good representation of the food product inside through the packaging graphics. Thus, a novel solution is required to solve this distortion problem whereby the barrier and sealing performance of the film is not diminished.

U.S. Pat. No. 5,500,282 discloses the use of a moisture barrier oriented polypropylene film containing a high crystalline polypropylene (HCPP) of isotactic content greater than 93% with an amount of polyterpene resin sufficient to improve moisture barrier properties. The inventors cite improvement in moisture barrier of less than or equal to 0.25 g/100 in 2/day/mil, but do not disclose any improvement in resistance to deformation due to oil absorption.

U.S. Pat. No. 5,667,902 discloses the use of a moisture barrier oriented polypropylene film containing a blend of high crystalline polypropylene of isotactic content greater than 93% with a second polypropylene of isotactic content between 90 and 93%, and a third component of a resin modifier of up to 9% to improve moisture barrier properties of the film. The inventors do not disclose any improvement in resistance to deformation due to oil absorption.

It is the objective of this invention to provide an economical solution to this package distortion problem caused by the oils of the food product.

SUMMARY OF THE INVENTION

This invention provides a film that does not distort in the presence of food oils from snack food products. This invention further maintains the necessary properties of the film including oxygen barrier, moisture barrier, cold seal adhesion, and heat seal performance. Achieving these objectives will result in a package with very good surface aesthetics, excellent heat seal or cold seal adhesion performance, and exceptional barrier performance.

In the case of potato chip packaging, oils such as cottonseed oil, corn oil, and soybean oil are used to fry the chips and thus, are present on the potato chip's surface. Some of these oils transfer from the potato chip to the package's inner surface. Since these oils are non-polar, they can be readily absorbed by the polypropylene film that makes up the package, particularly at elevated temperatures. We consider that this absorption of food oils by the film gives a distorted appearance to portions of the entire package. Typically, oriented polypropylene films available on the market do not address this issue.

We have determined that increasing the thickness of the lamination can reduce the degree and amount of distortion. We have further determined that the oil does not penetrate through the aluminum layer of a metallized OPP film and therefore only swells and distorts the non-metallized portion of the metallized film that is in direct contact with the potato chips. Thus, increasing the lamination thickness lends additional support and stiffness to the overall package lamination and reduces the amount of oil swelling and distortion of the entire package. However, increasing the lamination thickness is not always economical since consuming more raw materials is always considerably more expensive.

One aspect of the invention is a polyolefinic based coextruded oriented film comprising: a layer that comprises a high crystalline polypropylene polymer of a specific isotactic content plus an optional amount of hydrocarbon resin as a processing aid, whereby this layer may be additionally treated by a discharge surface treatment method that imparts a high surface energy; a surface layer comprising a polyolefin based resin that imparts excellent heat seal properties or cold seal receptivity.

This invention provides a polyolefin film having at least two layers, including a skin layer, which provides excellent heat seal performance or cold seal adhesion. A core layer, adjacent to the heat seal or cold seal adhesion layer, is the main layer which is comprised of high crystalline polypropylene of a specific isotactic content which provides resistance to distortion caused by food oils. A second polyolefinic skin layer may also be incorporated on the opposite side of the core layer from the first skin layer. This second skin layer may function as a layer for metallization, printing, adhesive lamination, extrusion lamination, or coatings. More particularly preferred is a layer for metallization.

Without being bound to any theory, we consider that the high crystalline polypropylene with very high isotactic content is important to the invention as this acts as a barrier to the food oils that come in contact with this film. The high crystalline polypropylene absorbs much less oil than normal crystalline polypropylenes and thus do not exhibit as much oil swelling or oil distortion. In addition, the higher modulus that such high crystalline polypropylenes impart to the film improve the overall package's stiffness which also helps limit the amount and degree of oil distortion. The degree of crystallinity of the polypropylene is directly proportional to its isotactic content.

DETAILED DESCRIPTION OF THE INVENTION

In one embodiment of the invention, the invention is a multi-layer sealable polyolefin film that provides excellent resistance to distortion caused by food oils. Specifically, the film is a biaxially oriented polypropylene multi-layer film with the following structure:

A layer comprising a high crystalline polypropylene resin layer, preferably of isotactic content of about 95% or greater, more preferably between about 95 and about 98% isotactic. An optional amount of a hydrocarbon resin material may be added as a processing aid. Optional amounts of slip or antiblock additives may also be added to improve functionality. One side of this layer can be further treated by a discharge surface treatment method to impart a high surface energy for providing a suitable surface for metallizing or printing or other useful purposes.

A heat sealable layer or a non-heat sealable, winding layer suitable for cold seal cohesive adhesion formed on the core resin layer, opposite the treated surface.

The polypropylene core resin layer is a high crystalline polypropylene of a specific isotactic content and can be uniaxially or biaxially oriented. High crystalline polypropylenes are generally described as having an isotactic content of about 93% or greater. Conventional polypropylenes (non-high crystalline) are generally described as having an isotactic content of about 90–93%. In the present invention, it has been found that those high crystalline polypropylenes in the range of about 95% or greater isotactic content have significantly better resistance to oil absorption and resultant oil distortion in film form than high crystalline polypropylenes of less than about 95% isotactic content and non-high crystalline polypropylenes of isotactic content of less than about 93%. Preferably, the high crystalline polypropylene isotactic content is in the range of between about 95% and about 98% for the best combination of oil resistance and BOPP processing.

The desirable attributes of the high crystalline polypropylene of 95% or greater isotactic content is, of course, the isotactic content itself as measured by $^{13}C$ NMR spectra obtained in 1,2,4-trichlorobenzene solutions at 130° C. The % percent isotactic can be obtained by the intensity of the isotactic methyl group at 21.7 ppm versus the total (isotactic and atactic) methyl groups from 22 to 19.4 ppm. Suitable examples of high crystalline polypropylenes for oil resistant film production are Fina 3270, Exxon 1043N, Huntsman 6310, and Amoco 9117. These resins also have melt flow rates of about 0.5 to 5 g/10 min, a melting point of about 163–167° C., a crystallization temperature of about 108–126° C., a heat of fusion of about 86–110 J/g, a heat of crystallization of about 105–111 J/g, and a density of about 0.90–0.91.

The core resin layer can also include an optional amount of hydrocarbon resin additive. Inclusion of this additive aids in the biaxial orientation of the film, although it is not necessary. In terms of oil resistance improvement, the addition of the hydrocarbon resin processing aid is negligible and thus, is not required for obtaining excellent oil distortion resistance. As a processing aid, though, inclusion of the hydrocarbon resin allows a wider "processing window" in terms of processing temperatures for MD and particularly TD orientation. A suitable hydrocarbon resin is of the polydicyclopentadiene type available in masterbatch form from ExxonMobil as PA609A or PA610A, which are 50% masterbatches of polypropylene carrier resin and 50% hydrocarbon resin. Suitable amounts of the hydrocarbon masterbatch are concentrations of up to 10% masterbatch or up to 5% of the active hydrocarbon resin component.

The core resin layer is typically 5 μm to 50 μm in thickness after biaxial orientation, preferably between 10 μm and 25 μm, and more preferably between 12.5 μm and 17.5 μm in thickness.

The core resin layer can be surface treated with either a corona-discharge method, flame treatment, atmospheric plasma, or corona discharge in a controlled atmosphere of nitrogen, carbon dioxide, or a mixture thereof. The latter treatment method in a mixture of $CO_2$ and $N_2$ is preferred. This method of discharge treatment results in a treated surface that comprises nitrogen-bearing functional groups, preferably 0.3% or more nitrogen in atomic %, and more preferably 0.5% or more nitrogen in atomic %. This treated core layer can then be metallized, printed, coated, or extrusion or adhesive laminated. A preferred embodiment is to metallize the treated surface of the core resin layer.

In the case of a heat sealable layer formed on the high crystalline polypropylene core resin layer, opposite the treated surface of the core resin layer, the heat sealable layer is composed of any of the following and blends thereof: an ethylene-propylene random copolymer, ethylene-butene-1 copolymer, ethylene-propylene-butene-1 terpolymer, propylene-butene copolymer, low density polyethylene, linear low density polyethylene, metallocene catalyzed polyethylene plastomer, metallocene catalyzed polyethylene, metallocene catalyzed polyethylene copolymers, ethylene-methacrylate copolymer, ethylene-vinyl acetate copolymer, and ionomer resin. "Low density polyethylene" and "linear low density polyethylene" are well-known terms used to define grades of polyethylene. In addition, it is useful to add optional additives such as slip agents and antiblock agents with these sealant materials in a concentration of about 0.05–0.5% by weight of the heat sealable resin layer.

The heat sealable layer thickness is between 0.2 and 5 μm, preferably between 0.6 and 3 μm, and more preferably between 0.8 and 1.5 μm.

In the case of a cold seal cohesive adhesion layer formed on the high crystalline polypropylene core resin layer, opposite the treated surface of the core resin layer, the cold seal cohesive adhesion layer may be composed of any of the following and blends thereof: polypropylene (90–93% isotactic), low isotactic polypropylene (less than 90% isotactic), a matte layer of a block copolymer blend of polypropylene and one or more other polymers whose surface is roughened during the film formation step so as to produce a matte finish on the winding layer, metallocene catalyzed polyethylene, ethylene propylene random copolymer, metallocene catalyzed polypropylene, butene propylene copolymer. It is often desirable to add antiblock additives to this layer in concentrations of 0.05–0.5% by weight of the cold seal adhesion layer for machinability and winding. In addition, it is also desirable to treat the surface of this layer with a discharge treatment method such as corona, flame, or plasma, in order to increase the surface energy and enhance adhesion of the cold seal cohesive to the layer.

In another embodiment of the invention, all of the above embodiment's elements are considered with the exception of discharge treating the high crystalline polypropylene core resin layer's surface. Instead, a third layer is formed on the high crystalline core layer opposite the heat sealable or cold seal cohesive adhesion layer. In this embodiment, this third layer is surface treated by a discharge treatment method and is used as a layer to enhance metallization, printing, or lamination. A preferred use is as a metal adhesion layer. This third layer may be composed of any of the following or blends thereof: polypropylene, low isotactic polypropylene, ethylene propylene random copolymer, butene propylene copolymer, and other polyolefins and additives that are suitable for metallizing. In addition, it is desirable to add antiblock additives to this layer in concentrations of 0.01–0.1% by weight of this third layer.

The thickness of this third layer is between 0.2–5 μm, preferably between 0.2–2 μm, and more preferably between 0.5–1 μm.

In the case where this invention is metallized, vapor-deposition of a metal is formed on the discharge-treated surface of the metal adhesion layer or on the discharge-treated surface of the high crystalline polypropylene core resin layer. The metallized film may include titanium, vanadium, chromium, manganese, iron, cobalt, nickel, copper, zinc, aluminum, gold, or palladium, the preferred being aluminum. The metal layer shall have a thickness between 5 and 100 nm, preferably between 30 and 70 nm; and an optical density between 2.0 and 5.0, preferably between 2.2 and 3.2.

The high crystalline oil resistant polypropylene resin is coextruded with the heat sealable or cold seal adhesion layer and the optional third layer for metal adhesion. The coextrusion process includes a two-layered or three-layered compositing die. The multi-layer laminate sheet is cast onto a cooling drum whose surface temperature is controlled between 20° C. and 60° C. to solidify the non-oriented laminate sheet.

The non-oriented laminate sheet is stretched in the longitudinal direction at about 135 to 165° C. at a stretching ratio of about 4 to about 5 times the original length and the resulting stretched sheet is cooled to about 15° C. to 50° C. to obtain a uniaxially oriented laminate sheet. The uniaxially oriented laminate sheet is introduced into a tenter and preliminarily heated between 130° C. and 180° C., and stretched in the transverse direction at a stretching ratio of about 7 to about 12 times the original length and then heat set to give a biaxially oriented sheet. The biaxially oriented film has a total thickness between 6 and 40 μm, preferably between 10 and 20 μm, and most preferably between 12 and 18 μm.

The surface of the polyolefin resin layer of the biaxially oriented laminate film is subjected to a discharge treatment, preferably a corona-discharge treatment. The discharge treatment is preferably conducted in an atmosphere of air, $CO_2$, $N_2$ or a mixture thereof, and more preferably in a mixture of $CO_2$ and $N_2$. The treated laminate sheet is then wound in a roll. The roll is placed in a metallizing chamber and the metal is vapor-deposited on the discharge treated polyolefin resin layer surface. The metal film may include titanium, vanadium, chromium, manganese, iron, cobalt, nickel, copper, zinc, aluminum, gold, or palladium, the preferred being aluminum.

This invention will be better understood with reference to the following examples, which are intended to illustrate specific embodiments within the overall scope of the invention.

EXAMPLE 1

One hundred parts by weight of a high crystalline propylene homopolymer resin of isotactic content of about 95.3%. This mixture was coextruded with a heat sealable ternary ethylene-propylene-butene copolymer containing 4000 ppm of a crosslinked silicone polymer of mean particle diameter of 2 μm by weight of the heat sealable layer, and biaxially oriented to produce a 2-layer film where the high crystalline propylene homopolymer resin layer was 16 μm thick and the accompanying coextruded ternary ethylene-propylene-butene copolymer layer was 1.5 μm thick. The total oriented film thickness was 17.5 μm or 70 G or 0.7 mil thick. The film was then discharge-treated in a controlled atmosphere of $N_2$ and $CO_2$, on the propylene homopolymer side (the metallizing surface) and wound in roll form. The roll was then metallized by vapor-deposition of aluminum onto the discharge-treated surface to an optical density target of 2.2–2.6. The metallized laminate film was then tested for resistance to oil distortion, oxygen and moisture permeability, optical density, and physical properties.

EXAMPLE 2

A process similar to Example 1 was repeated except that the high crystalline propylene homopolymer had an isotactic content of about 97.3%.

EXAMPLE 3

A process similar to Example 2 was repeated except that the multi-laminate film included a coextruded third layer comprised of a conventional propylene homopolymer resin with 0.027% of a 3 μm sodium calcium aluminosilicate antiblock which is formed on the high crystalline propylene homopolymer core resin layer opposite the heat sealable layer. The surface of this coextruded third layer was then discharge-treated in a controlled atmosphere of $N_2$ and $CO_2$ and wound into roll form for subsequent vapor deposition metallizing.

COMPARATIVE EXAMPLE 1

A process similar to Example 1 was repeated except that the high crystalline propylene homopolymer had an isotactic content of about 93.3%.

COMPARATIVE EXAMPLE 2

A process similar to Example 1 was repeated except that the propylene homopolymer had an isotactic content of about 92.5%.

COMPARATIVE EXAMPLE 3

A process similar to Example 3 was repeated except that the high crystalline propylene homopolymer core layer resin had an isotactic content of about 93.3%.

Test Methods

The various properties in the above examples were measured by the following methods:

Oxygen transmission rate of the film was measured by using a Mocon Oxtran 2/20 unit substantially in accordance with ASTM D3985. Moisture transmission rate of the film was measured by using a Mocon Permatran 3/31 unit measured substantially in accordance with ASTM F1249. In general, preferred values of $O_2TR$ would be equal or less than 46.5 $cc/m^2/day$ and MVTR would be equal or less than 0.69 $g/m^2/day$.

Optical density was measured using a Tobias Associates model TBX transmission densitometer. Optical density is defined as the amount of light reflected from the test specimen under specific conditions. Optical density is reported in terms of a logarithmic conversion. For example, a density of 0.00 indicates that 100% of the light falling on the sample is being reflected. A density of 1.00 indicates that 10% of the light is being reflected; 2.00 is equivalent to 1%, etc.

Oil distortion resistance was measured by subjecting the candidate films to exposure with crushed potato chips. The candidate films may be tested in metallized or unmetallized form as long as in the case of a metallized form, the test surface that the crushed potato chips contact is the non-metallized surface. Substantially the same results can be obtained with an unmetallized film, since the unmetallized side of the film is exposed to the potato chip oils. The candidate films were first prepared by extrusion laminating them with 7 lbs/ream white LDPE to a 70 G slip film to simulate a typical potato chip package film lamination. The structure was thus: 70 G slip film/7 lbs white LDPE/Al/70 G candidate film. A piece of the lamination was cut approximately 3.5 inches×3.5 inches in size. 10 grams of crushed potato chips were placed on the center of the candidate film's heat sealable side (non-metallized side) of the lamination structure and aged for 12 hours in a 130° F. oven. Preferred potato chip brands for use were Frito-Lay's Classic Lays™. Other potato chip brands may also be used provided that 1) the potato chips contain ca. 10 g fat per 1 oz. serving of chips; and 2) the chips have been cooked in corn, cottonseed, sunflower, or soybean oil or blends thereof. After aging, the crushed potato chips were removed, the candidate films were wiped with an alcohol swab to remove surface oils and salt crystals from the crushed potato chips, and rated on a scale of 1–5 for degree of oil distortion. A rating of 1 was "Excellent", indicating no oil distortion; 2 was "Good", indicating a minor amount of oil distortion; 3 was "Satisfactory", indicating a moderate amount of oil distortion; 4 was "Poor", indicating a large amount of oil distortion; and a rating of 5 was "Unacceptable", indicating severe oil distortion.

Oil absorption of the candidate films was measured by subjecting the candidate films (without laminating as in (C) above) to immersion in corn oil for 24 hours at 130° F. The candidate films may be immersed in the oil in either metallized or unmetallized form, with substantially the same results obtained, although unmetallized film is preferred for simplicity. The film samples were weighed before and after immersion and the difference in weight recorded as a percentage weight gain.

The results of the foregoing examples ("Ex.") and comparative example ("CEx.") are shown in Table 1.

Table 1 shows the oil distortion resistance ratings of the candidate film laminations. The oil distortion resistance of the high crystalline propylene homopolymer candidates of isotactic content of greater than about 95% (Ex. 1, 2, and 3) are far superior to that of high crystalline propylene homopolymer candidates of greater than about 93% isotactic (CEx. 1 and 3) and propylene homopolymer candidates of less than 93% isotactic (CEx. 2). Table 1 also shows that Ex. 1, 2, 3 also absorb less oil after immersion in corn oil than CEx. 1, 2, 3 which supports the oil resistance findings.

TABLE 1

| Sample | % isotactic | Oil Resistant Rating | Oil Absorption % |
|--------|-------------|----------------------|------------------|
| Ex. 1  | 95.3        | 2                    | 2.60             |
| Ex. 2  | 97.3        | 1                    | 1.82             |
| Ex. 3  | 97.3        | 1                    | 1.41             |
| CEx. 1 | 93.3        | 4                    | 3.18             |
| CEx. 2 | 92.5        | 5                    | 3.34             |
| CEx. 3 | 93.3        | 4                    | 3.51             |

What is claimed is:

1. A metallized polyolefinic multi-layer film comprising at least:

a high crystalline propylene homopolymer resin layer of isotactic content greater than about 95%;

a discharge-treated surface on one side of said polyolefin resin layer;

on the high crystalline propylene homopolymer resin layer side opposite said discharge-treated surface, a heat sealable layer or winding layer comprising a antiblock comprising a material selected from the group consisting essentially of amorphous silicas, aluminosilicates, sodium calcium aluminum silicate, and a polymeric antiblock;

a metal layer vapor-deposited on the discharge-treated side of the high crystalline propylene homopolymer core resin layer opposite the heat sealable or winding layer;

wherein the film has good or excellent resistance to film distortion that is caused by the absorption of food oils.

2. A coextruded multilayer film, comprising of at least:

a high crystalline propylene homopolymer resin layer of isotactic content greater than about 95%;

a discharge-treated surface on one side of said polyolefin resin layer;

an amount of hydrocarbon resin up to 10% by weight of the high crystalline propylene homopolymer of greater than about 95% isotactic content;

a metal layer and on the high crystalline propylene homopolymer resin layer side opposite said discharge-treated surface, a heat sealable layer or winding layer comprising an antiblock comprising a material selected from the group consisting of amorphous silicas, aluminosilicates, sodium calcium aluminum silicate, and a polymeric antiblock.

3. The film according to claim 2 or 1, wherein said high crystalline propylene homopolymer resin layer has a thickness of about 6 to 40 μm.

4. The film of claim 2 or 1, wherein said heat-sealable layer or winding layer has a thickness of about 0.5 to 5.0 μm.

5. The film of claim 2 or 1, wherein said heat sealable or winding layer comprises an anti-blocking agent of about 0.05 to 0.5 percent by weight of said heat sealable or winding layer.

6. The film of claim 2, wherein said heat sealable layer composition is selected from the group consisting of an ethylene-propylene random copolymer, ethylene-butene-1 copolymer, ethylene-propylene-butene-1 terpolymer, propylene-butene copolymer, low density polyethylene, linear low density polyethylene, density polyethylene, metallocene catalyzed polyethylene plastomer, metallocene catalyzed polyethylene, metallocene catalyzed polyethylene copolymers, ethylene-methacrylate copolymer, ethylene-vinyl acetate copolymer, ionomer resin and blends thereof.

7. The film of claim 2, wherein said winding layer composition is selected from the group consisting of a crystalline polypropylene of 90–93% isotactic content, a low isotactic polypropylene having less than 90% isotactic content, a matte layer of a block copolymer blend of polypropylene, a polymer having a matte finish surface, metallocene catalyzed polyethylene, ethylene propylene random copolymer, metallocene catalyzed polypropylene, butene propylene copolymer, and blends thereof.

8. The film of claim 2 or 1, wherein said winding layer is treated to provide a surface for lamination or coating with adhesives or inks.

9. The film of claim 2 or 1, wherein said high crystalline propylene homopolymer has an isotactic content of about 95–98%, melt flow rate of about 0.5 to 5 g/10 min, a melting point of about 163–167° C., a crystallization temperature of about 108–126° C., a heat of fusion of about 86–110 J/g, a heat of crystallization of about 105–111 J/g, and a density of about 0.90–0.91.

10. The film of claim 2 or 1, wherein said metal layer has an optical density of 2.0 to 5.0.

11. The film of claim 2 or 1, wherein said metal layer comprises aluminum.

12. The film of claim 2 or 1, wherein said discharge treatment of said polyolefin resin layer or second polyolefin resin layer is performed in an atmosphere of $CO_2$ and $N_2$.

13. The film of claim 2 or 1, further comprising an amount of hydrocarbon resin up to 10% by weight of the propylene homopolymer resin layer of isotactic content greater than about 95%.

14. The film of claim 13, wherein said hydrocarbon resin is a polydicyclopentadiene resin.

15. The film of claim 2 or 1, wherein the polymeric antiblock a crosslinked silicone polymer, polymethylmethacrylate or a blend thereof.

* * * * *